Patented Nov. 14, 1944

2,362,960

UNITED STATES PATENT OFFICE 2,362,960

COPOLYMERIZATION PRODUCT OF VINYL CHLORIDE AND VINYL FLUORIDE

Charles A. Thomas, Dayton, Ohio, assignor to Monsanto Chemical Company, St. Louis, Mo., a corporation of Delaware No Drawing. Application May 8, 1941, Serial No. 392,497

5 Claims. (Cl. 260—86)

This invention relates to new and improved vinyl halide polymeric products and a process of preparing the same.

Certain vinyl halide polymeric products, for example, polyvinyl chloride, have long been known to those skilled in the art. However, the use of polyvinyl chloride has been restricted due to its inherent properties, one of which is its marked insolubility in organic solvents. It is an object of this invention to polymerize vinyl chloride under such conditions that an improved polymeric product is prepared. A particular object is to prepare an improved vinyl halide polymeric product from mixtures comprising vinyl chloride and vinyl fluoride.

It has been found, according to the present invention, that by subjecting mixtures comprising vinyl fluoride and vinyl chloride to polymerizing conditions, new polymerization products are readily obtainable with unexpected and improved properties. The following is a specific example illustrative, but not limitative, of the present invention.

Example 1

Substantially 1 part by weight of benzoyl peroxide was placed in a suitable vessel capable of withstanding pressure, as for example, a stainless steel bomb. The bomb and its contents were then cooled in a suitable manner, as for example, by immersing the bomb in liquid air. Thereafter, substantially 50 parts by weight of vinyl fluoride and substantially 50 parts by weight of vinyl chloride were distilled into the bomb and the bomb closed. The closed bomb and its contents were then warmed with suitable mixing to substantially 40° C. and maintained at substantially that temperature for substantially 12 days. The resulting product, after suitable purification, was a light-colored solid co-polymer soluble in methyl ethyl ketone, and swelled by contact with dioxane. This product was found to possess a softening point of substantially 150° C. as determined by the temperature at which the powdered material, placed in thin layers on a copper bar, "wetted" the bar sufficiently to adhere to it slightly.

The new and improved properties of the products of this invention are illustrated by comparison of the properties of the product of Example 1 with those of polyvinyl chloride prepared in a similar manner under Example 2.

Example 2

Vinyl chloride was polymerized in the presence of substantially 1% of benzoyl peroxide at substantially 40° C. for 4 days. The resulting polymeric product was a substantially opaque, white solid, insoluble in common organic solvents including methyl ethyl ketone. The softening point of this material, determined in the same manner as in Example 1, was found to be substantially 128° C.

Thus, it is clearly evident from the foregoing examples that the products of the present invention possess increased utility in comparison with products prepared by similar polymerization of vinyl chloride per se. Particular attention is directed to the increased solubility and higher softening point of the product of Example 1, in comparison with the product of Example 2. Moreover, vinyl fluoride when heated in the presence of a peroxide catalyst, for example benzoyl peroxide, undergoes substantially no polymerization.

The new products of this invention may be advantageously employed for many of the applications of plastic materials. Furthermore, other polymerized or polymerizable materials, plasticizers, fillers, coloring agents and other materials may be added to the products of this invention in any suitable manner, such as by mixing in a Banbury mixer or on mixing rolls. The products of this invention may be mixed, rolled, calendered, extruded, molded or otherwise formed with and without the addition of added materials of the types listed above.

There are many variations that may be introduced into the process of preparing the new polymerizates of this invention. Thus, for example, the process of this invention is not limited to any particular type of polymerization apparatus, type of catalyst, or other means of accelerating the polymerization, amount of catalyst, polymerization temperature, polymerization pressure (except to avoid escape of volatile components), duration of polymerization, etc. While vinyl fluoride and vinyl chloride may be mixed in any desired proportion and the mixture polymerized, it is generally preferred that the vinyl fluoride be employed in an amount at least equal to 25% of the weight of the total reactants employed. Furthermore, the mixtures may be polymerized in suitable solvents for the monomeric materials, or in the presence of suitable liquids that are non-solvents for the monomeric materials. Thus, the particular properties desired in the product and the use to which the material is to be placed can govern to a considerable degree the exact polymerization conditions employed.

This invention is limited solely by the claims attached hereto.

What is claimed is:

1. A process of preparing a polymerization product which comprises subjecting a mixture comprising vinyl fluoride and vinyl chloride to polymerization conditions, the amount of vinyl fluoride in said mixture being at least equal to 25% of the combined weights of the vinyl fluoride and the vinyl chloride, but not over an amount about equal to the amount of vinyl chloride.

2. A process of preparing a polymerization product which comprises subjecting a mixture comprising vinyl fluoride and vinyl chloride to polymerization conditions in the presence of a polymerization catalyst, the amount of vinyl fluoride in said mixture being at least equal to 25% of the combined weights of the vinyl fluoride and the vinyl chloride, but not over an amount about equal to the amount of vinyl chloride.

3. A process of preparing a co-polymer comprising polymerizing a mixture of vinyl fluoride and vinyl chloride in the presence of an organic peroxide catalyst, the amount of vinyl fluoride in said mixture being at least equal to 25% of the combined weights of the vinyl fluoride and the vinyl chloride, but not over an amount about equal to the amount of vinyl chloride.

4. A process of preparing a co-polymer comprising polymerizing in admixture vinyl fluoride and vinyl chloride in the presence of benzoyl peroxide, the amount of vinyl fluoride in said mixture being at least equal to 25% of the combined weights of the vinyl fluoride and the vinyl chloride, but not over an amount about equal to the amount of vinyl chloride.

5. As a new composition of matter, a co-polymer of vinyl chloride and vinyl fluoride, prepared by subjecting to polymerization conditions a mixture comprising vinyl fluoride and vinyl chloride in which the amount of vinyl fluoride is at least equal to 25% of the combined weights of the vinyl fluoride and vinyl chloride, but not over an amount about equal to the amount of vinyl chloride.

CHARLES A. THOMAS.